United States Patent
Koui (10) Patent No.: US 8,724,262 B1
(45) Date of Patent: May 13, 2014

(54) MAGNETIC HEAD AND MAGNETIC RECORDING/REPRODUCTION APPARATUS THAT DECREASES OSCILLATION DRIVING VOLTAGE OF A SPIN TORQUE OSCILLATION ELEMENT

(71) Applicant: Kabushiki Kaishi Toshiba, Minato-ku (JP)

(72) Inventor: Katsuhiko Koui, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 13/903,077

(22) Filed: May 28, 2013

(30) Foreign Application Priority Data

Dec. 21, 2012 (JP) .................................. 2012-279301

(51) Int. Cl.
*G11B 5/127* (2006.01)
*G11B 5/31* (2006.01)

(52) U.S. Cl.
USPC ........................................ 360/125.3; 360/128

(58) Field of Classification Search
CPC ..................... G11B 2005/0024; G11B 5/1278; G11B 5/314; G11B 5/3146; G11B 5/02; G11B 5/127; G11B 5/187; G11B 5/147
USPC .................... 360/125.3, 125.71, 128
See application file for complete search history.

(56) References Cited

U.S. PATENT DOCUMENTS

| | | | | |
|---|---|---|---|---|
| 7,616,412 B2 * | 11/2009 | Zhu et al. | ................. | 360/324.2 |
| 7,982,996 B2 * | 7/2011 | Smith et al. | ................. | 360/59 |
| 8,164,861 B2 * | 4/2012 | Braganca et al. | ............. | 360/313 |
| 8,320,080 B1 * | 11/2012 | Braganca et al. | ............. | 360/128 |
| 8,446,691 B2 * | 5/2013 | Takagishi et al. | .......... | 360/125.3 |
| 8,462,461 B2 * | 6/2013 | Braganca et al. | .......... | 360/125.3 |
| 8,553,362 B2 * | 10/2013 | Tanabe et al. | ............. | 360/125.3 |
| 2004/0252414 A1 | 12/2004 | Mao et al. | | |
| 2008/0080100 A1 | 4/2008 | Sato et al. | | |
| 2009/0052095 A1 | 2/2009 | Yamada et al. | | |
| 2010/0053821 A1 | 3/2010 | Watanabe et al. | | |
| 2010/0073806 A1 * | 3/2010 | Koui et al. | ...................... | 360/75 |
| 2012/0262821 A1 * | 10/2012 | Taguchi et al. | ............ | 360/99.08 |
| 2013/0065086 A1 * | 3/2013 | Kudo et al. | ................... | 428/815 |
| 2013/0148242 A1 * | 6/2013 | Koui et al. | ............... | 360/125.12 |

FOREIGN PATENT DOCUMENTS

| | | |
|---|---|---|
| JP | 8-56071 | 2/1996 |
| JP | 2005-4942 | 1/2005 |
| JP | 2008-84482 | 4/2008 |
| JP | 2008-98557 | 4/2008 |
| JP | 2009-70541 | 4/2009 |
| JP | 2010-055657 | 3/2010 |

\* cited by examiner

*Primary Examiner* — Brian Miller
(74) *Attorney, Agent, or Firm* — Oblon, Spivak, McClelland, Maier & Neustadt, L.L.P.

(57) ABSTRACT

A magnetic head is provided, including a filling layer formed on the side of a spin torque oscillation element between the main magnetic pole and the auxiliary magnetic pole, the filling layer being divided into an insulator region and a metal region from a first interface as a boundary. The insulator region is formed from a side of a spin injection layer to a side of a nonmagnetic interlayer, and to a side of one portion of an oscillation layer. The first interface is closer to the oscillation layer by 0.5 nm or more than a second interface between the nonmagnetic interlayer and the oscillation layer. A magnetic recording/reproduction apparatus having the magnetic head is also provided.

6 Claims, 4 Drawing Sheets

MAGNETIC HEAD AND MAGNETIC RECORDING/REPRODUCTION APPARATUS THAT DECREASES OSCILLATION DRIVING VOLTAGE OF A SPIN TORQUE OSCILLATION ELEMENT

CROSS-REFERENCE TO RELATED APPLICATIONS

This application is based upon and claims the benefit of priority from Japanese Patent Application No. 2012-279301, filed Dec. 21, 2012, the entire contents of which are incorporated herein by reference.

FIELD

Embodiments described herein relate generally to a magnetic head and magnetic recording/reproduction apparatus.

BACKGROUND

In the 1990s, an MR (Magneto-Resistive effect) head and GMR (Giant Magneto-Resistive effect) head were put to practical use, and this dramatically increased the recording density and recording capacity of an HDD (Hard Disk Drive). In the 2000s, however, the problem of thermal fluctuation of a magnetic recording medium became conspicuous, and the increasing speed of the recording density temporarily decreased. Still, the recording density of the HDD is recently increasing by about 40% per year because perpendicular magnetic recording more advantageous for high-density recording in principle than in-plane magnetic recording was put to practical use in 2005.

Even when using this perpendicular magnetic recording method, however, it is probably not easy to increase the recording density because the problem of thermal fluctuation becomes conspicuous.

"A microwave assisted magnetic recording method" has been proposed as a recording method capable of solving this problem. In this microwave assisted magnetic recording method, a microwave magnetic field near the resonance frequency of a magnetic recording medium, which is much higher than a recording signal frequency, is locally applied to the medium. Consequently, the magnetic recording medium resonates, and the coercive force (Hc) the magnetic recording medium to which the microwave magnetic field is applied becomes half or less the original coercive force. By superposing a microwave magnetic field on a recording magnetic field, therefore, magnetic recording can be performed on a magnetic recording medium having a higher coercive force (Hc) and higher magnetic anisotropic energy (Ku).

Unfortunately, a large current must be applied to a spin torque oscillation element (STO) as a microwave generation source of microwave assisted recording. Since this generates Joule heat, long-term reliability is difficult to ensure. A necessary electric current increases especially when the magnetic volume (Mst) of an oscillation layer (FGL) is increased in order to increase the microwave magnetic field strength. Accordingly, demands have arisen for decreasing the oscillation driving voltage of the STO, thereby achieving both a strong microwave magnetic field and long-term reliability.

DETAILED DESCRIPTION

In general, according to one embodiment, a magnetic head includes a main magnetic pole for applying a recording magnetic field to a magnetic recording medium, an auxiliary magnetic pole for forming a magnetic circuit together with the main magnetic pole, and a spin torque oscillation element formed between the main magnetic pole and auxiliary magnetic pole.

The spin torque oscillation element includes a spin injection layer formed on one of the main magnetic pole and auxiliary magnetic pole, a nonmagnetic interlayer formed on the spin injection layer, and an oscillation layer formed on the nonmagnetic interlayer.

A filling layer is divided into an insulator region and metal region from a first interface as a boundary.

The insulator region is formed from the side of the spin injection layer to the side of the nonmagnetic interlayer, and to the side of one portion of the oscillation layer.

The metal region is formed on the side of the other portion of the oscillation layer.

The first interface is positioned on the side surface of the oscillation layer.

A difference Δt between the position of the first interface and that of a second interface between the nonmagnetic interlayer and oscillation layer is 0.5 nm or more.

Also, a magnetic recording/reproduction apparatus according to the embodiment includes the above-mentioned magnetic head.

According to the embodiment, it is possible to obtain an element structure that decreases the oscillation driving voltage of a spin torque oscillation element, thereby obtaining a magnetic head capable of achieving both a strong microwave magnetic field and long-term reliability.

The embodiment will be explained below with reference to the accompanying drawings.

Figure 1:
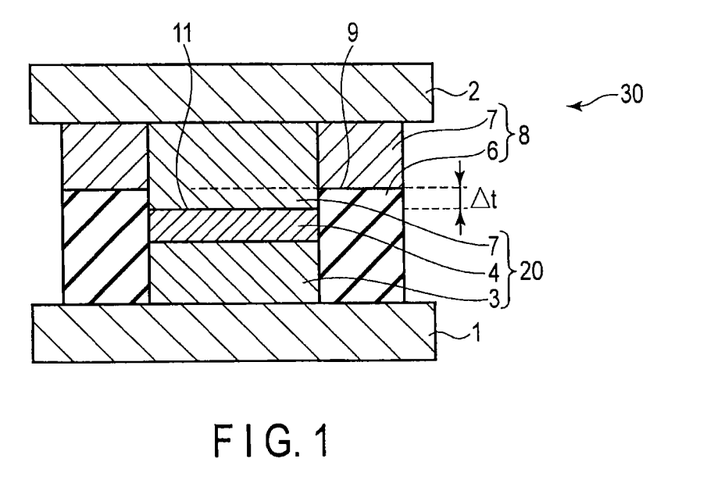
FIG. 1 is a schematic view showing an example of the arrangement of a magnetic head according to an embodiment.

FIG. 1 is a view showing the arrangement of an example of the magnetic head according to the embodiment.

As shown in FIG. 1, a magnetic head 30 includes a main magnetic pole 1 for applying a recording magnetic field to a magnetic recording medium, an auxiliary magnetic pole 2 for forming a magnetic circuit together with the main magnetic pole 1, a spin torque oscillation element 20 formed between the main magnetic pole 1 and auxiliary magnetic pole 2, and a filling layer 8 formed on the side of the spin torque oscillation element 20 between the main magnetic pole 1 and auxiliary magnetic pole 2.

The spin torque oscillation element 20 includes a spin injection layer 3 formed on the main magnetic pole 1, a nonmagnetic interlayer 4 formed on the spin injection layer 3, and an oscillation layer (FGL) 5 formed on the nonmagnetic interlayer 4.

Note that it is also possible to form the main magnetic pole 1 after stacking the spin injection layer 3, nonmagnetic interlayer 4, and oscillation layer (FGL) 5 on the auxiliary magnetic pole 2.

The filling layer 8 is divided into an insulator region 6 and metal region 7 from a first interface 9 as a boundary. The insulator region 6 is formed from the side of the spin injection layer 3 to the side of the nonmagnetic interlayer 4, and to the side of one portion of the oscillation layer (FGL) 5. The metal region 7 is formed on the side of the other portion of the oscillation layer (FGL) 5. The position of the first interface 9 is closer to the oscillation layer by 0.5 nm or more than the position of a second interface 11 between the nonmagnetic interlayer and oscillation layer. That is, the difference $\Delta t$ between the position of the first interface 9 and that of the second interface 11 is 0.5 nm or more.

The oscillation layer (FGL) 5 is formed by a magnetic alloy made of at least one element selected from Fe, Co, and Ni. To generate a high microwave magnetic field, a material having a high saturation magnetic flux density (Bs) can be used. As the oscillation layer (FGL) 5, it is possible to use, e.g., an Fe alloy. As the Fe alloy, it is possible to use an Fe—Co—Ni alloy or Fe—Co alloy. To increase the Bs, the Fe alloy can contain Fe at a composition ratio of 30% or more. Furthermore, the FGL 5 can have a magnetic alloy multilayered structure. The Fe alloy can also contain another nonmagnetic metal element. Especially when an element selected from Al, Si, Cu, Ge, Ga, and Mn is added at a composition ratio of 30% or less to the Fe—Co alloy, the soft magnetic characteristic improves, and a damping constant that hinders spin torque oscillation can be reduced. Although the FGL 5 may have as large a film thickness as possible in order to obtain a microwave magnetic field, a large magnetic volume makes spin torque oscillation difficult. Therefore, the range of 5 to 30 nm is a film thickness range over which oscillation can be obtained.

As the nonmagnetic interlayer, it is possible to use a metal layer made of at least one metal selected from the group consisting of Al, Cu, Au, Ag, Pt, Al, Pd, Os, and Ir, a nonmagnetic alloy layer using this metal, or a stack of these layers. The thickness of the nonmagnetic interlayer can be smaller than the spin diffusion length, because spin torque is transferred from the spin injection layer (SIL) to the FGL. Although the spin diffusion length changes from one material to another, it is often 10 nm or more. Accordingly, the thickness of the nonmagnetic interlayer can be 10 nm or less. On the other hand, if the thickness is smaller than 0.5 nm, the FGL and SIL strongly magnetically couple with each other, and this hinders oscillation. Therefore, the thickness should be 0.5 nm or more.

The SIL has perpendicular magnetic anisotropy, and, in the presence of a gap magnetic field, can stably point in the direction of the gap magnetic field. On the other hand, when polarization reversal occurs in the gap magnetic field, the SIL can reverse and point in the same direction as that of the gap magnetic field. As the SIL, it is possible to use, e.g., a Co—Pt alloy, Fe—Pt alloy, Co/Pt artificial lattice, Co/Pd artificial lattice, Co/Ni artificial lattice, or FeCo/Ni artificial lattice. The film thickness of the SIL may be as large as possible because it is important to stabilize the magnetization direction during spin torque oscillation. However, the SIL must be formed as thin as possible due to the designing limitation that the STO must be formed thin as a whole. For example, stable oscillation can be achieved when the film thickness is 5 nm or more. The SIL can also have a soft magnetic layer between the SIL and nonmagnetic interlayer. When an FeCo alloy or half-metal alloy is formed, it is possible to increase the spin torque efficiency and decrease the driving voltage, thereby improving the reliability. On the other hand, when the soft magnetic layer is formed by stacking layers, the perpendicular magnetic anisotropy decreases as a whole, so the film thickness must be set so as not to significantly decrease the perpendicular magnetic anisotropy. The film thickness depends on the intensity of the perpendicular magnetic anisotropy and the film thickness of the SIL. When the film thickness does not exceed the film thickness of the SIL, however, perpendicular magnetic anisotropy can be obtained to a certain degree.

In the STO having the multilayered structure as described above, the order of deposition can be either the SIL, interlayer, and FGL, or the FGL, interlayer, and SIL.

The STO having the multilayered structure as described above is formed on the main magnetic pole. The main magnetic pole can also function as an electrode for supplying an electric current perpendicularly to the film surfaces of the STO.

When depositing the layers, an underlayer is formed to obtain a high perpendicular magnetic anisotropy of the SIL. A practical example functioning as the underlayer is a structure in which a 1- to 10-nm thick Ta layer or 2- to 15-nm thick Ni—Fe—Cr alloy is formed as an initial layer, and a 1- to 10-nm thick layer, alloy, or multilayered structure made of Al, Pt, Cu, Ru, NiFe, Au, Ag, Pd, Os, and/or Ir is formed on the initial layer.

In addition, a return yoke is formed on the STO. This return yoke may also function as an electrode for supplying an electric current perpendicularly to the film surfaces of the STO.

The return yoke and STO can directly be connected, and can also be stacked with a nonmagnetic metal layer being sandwiched between them. When the FGL is formed on the return yoke side, the magnetic coupling with the return yoke can be reduced by stacking the nonmagnetic metal layer. This is advantageous in respect of the driving voltage.

After being patterned, the STO can be buried by a filling layer including an insulator region and metal region, so as to apply an electric current from the upper and lower electrodes in the direction perpendicular to the film surfaces of the STO.

In this structure, the sidewalls of the SIL and nonmagnetic interlayer are buried by the insulator. $SiO_2$, alumina, or the like can be used as the insulating material.

The sidewalls of the FGL are buried by the metal except for the vicinity of the interface with the interlayer. The region buried by the metal does not contribute to spin torque because the applied electric current is shunted to the burying metal. The spin torque from the FGL to the SIL does not contribute to the oscillation of the STO, and, in addition to that, often disturbs the magnetization direction of the SIL, which must be stable in the direction perpendicular to the film surfaces. Accordingly, the FGL whose sidewalls are buried by the metal can stabilize the magnetization of the SIL. As the metal burying material, it is possible to use, e.g., layers of Al, Pt, Cu, Ru, Au, Ag, Pd, Os, and Ir, alloy layers of these metals, and multilayered films of these metals. It is also possible to use another metal as long as the metal is a nonmagnetic metal. If a magnetic metal is used, the metal often magnetically couples with the FGL, and hinders oscillation.

In the vicinity of the nonmagnetic interlayer, the thickness of the region where the FGL must be buried by the insulator, i.e., the difference between the position of the interface between the nonmagnetic interlayer and oscillation layer and the position of the interface between the insulator region and metal region is equal to a thickness necessary for spin-polarized electrons for generating spin torque to transfer their angular momentum in the FGL after they have passed through the nonmagnetic interlayer. When the thickness of the region where the FGL must be buried by the insulator is about the thickness of a few atomic layers, spin torque from the SIL acts. If the thickness is smaller than that, the spin-polarized electrons flow into the metal buried portion before transferring the angular momentum to the FGL, and this often decreases the spin torque efficiency. To more reliably transfer the entire angular momentum, the thickness can be 0.5 nm or more.

On the other hand, if the metal buried portion of the FGL is too thin and its insulator buried portion is too thick, the spin torque performance of the FGL increases in the insulator buried portion, and this often makes the magnetization direction of the SIL unstable. The spin torque performance of the FGL can be suppressed by making the film thickness of the insulator buried portion as small as possible. The spin torque performance increases in accordance with the film thickness of a magnetic metal and saturates at the spin diffusion length. Therefore, a desired effect can be achieved by making the film thickness of the insulator buried portion smaller than the spin diffusion length. For example, the effect can be achieved when the film thickness of the insulator buried portion is 10 nm or less. The film thickness can be made as small as possible in order to further increase the effect, but the effect almost saturates when the film thickness is 2 nm or less.

It is also possible to use a low-resistivity material as the burying material of the metal buried portion. As low-resistance metal layers, it is generally possible to use Cu, Au, Ag, Ru, Pt, Os, Ir, and their alloys. A larger effect can be obtained by making the resistivity of the metal burying material lower than that of the FGL.

FIGS. 2A, 2B, 2C, 2D, and 2E are views showing examples of steps of manufacturing the magnetic head according to the embodiment.

Figure 2A:
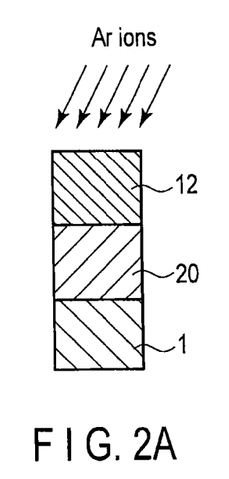
FIGS. 2A, 2B, 2C, 2D, and 2E are schematic views showing examples of the manufacturing steps of the arrangement of the magnetic head according to the embodiment.

First, as shown in FIG. 2A, a fine mask 12 is formed on an STO 20, and the STO 20 is patterned by Ar ion milling. The mask 12 can be formed by using carbon or the like.

Figure 2B:
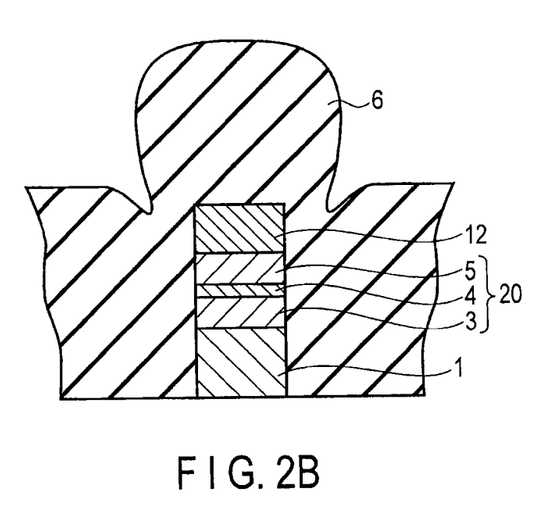

Then, as shown in FIG. 2B, an insulator burying layer 6 is formed by using $SiO_2$. The insulator burying layer can also be formed by using alumina, an oxide, or a nitride, instead of $SiO_2$.

Figure 2C:
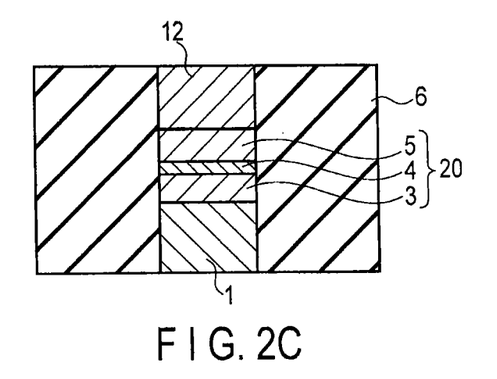

Subsequently, as shown in FIG. 2C, planarization is performed by chemical mechanical polishing (CMP).

Figure 2D:
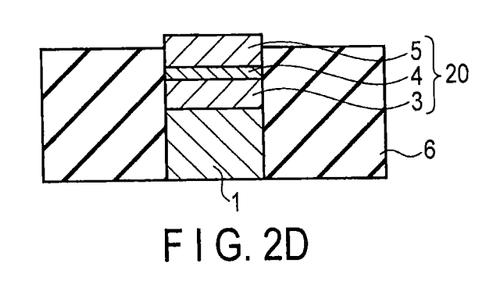

After that, as shown in FIG. 2D, the FGL 5 is exposed halfway by anisotropic etching performed by reactive ion etching (RIE).

Figure 2E:
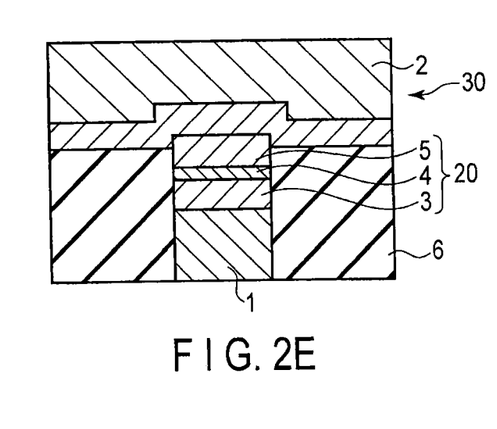

In addition, as shown in FIG. 2E, a metal burying layer 7 made of copper or the like is formed, and a return yoke 2 is formed. Consequently, a magnetic head having a desired structure can be manufactured.

Figure 3:
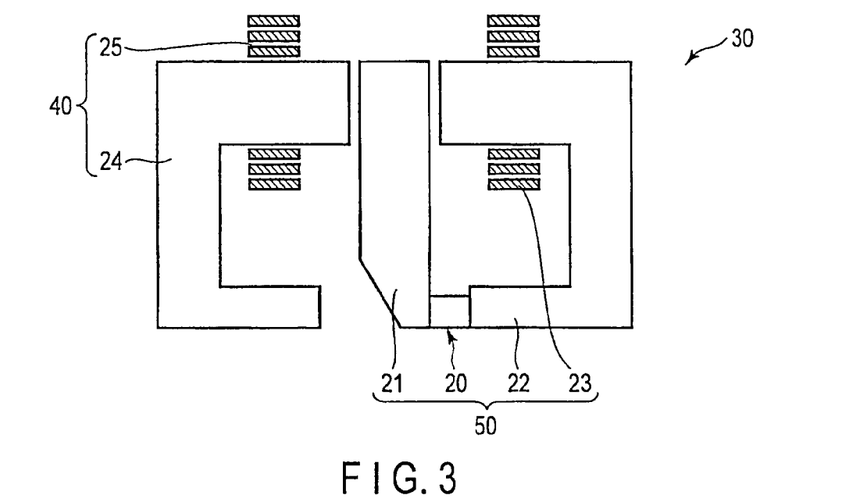
FIG. 3 is a schematic view showing another example of the arrangement of the magnetic head according to the embodiment.

FIG. 3 is a schematic view showing another example of the magnetic head according to the embodiment.

A magnetic head 30 according to the embodiment includes a read head unit 40 and write head unit 50. The read head unit 40 includes a magnetic read element (not shown), excitation coil 25, and leading shield 24. The write head unit 50 includes a main magnetic pole 21 as a recording magnetic pole, a trailing shield (auxiliary magnetic pole) 22 for returning a magnetic field from the main magnetic pole 21, a spin torque oscillation element 20 formed between the main magnetic pole 21 and trailing shield (auxiliary magnetic pole) 22, and an excitation coil 23. In the write head unit 50 of the microwave magnetic field assisted recording head 30, a gap magnetic field between the main magnetic pole 21 and trailing shield 22 applies an external magnetic field perpendicular to the film surfaces. Consequently, the oscillation layer performs precession around an axis almost perpendicular to the film surfaces as a rotational axis, thereby generating a microwave magnetic field outside. By superposing this microwave magnetic field generated from the spin torque oscillation element 20 on a magnetic field applied from the main magnetic pole, data can be written on a magnetic recording medium more suited to a higher recording density.

In the embodiment, the spin torque oscillation element having a low critical current density can be used as a microwave magnetic field generating source. This makes it possible to reverse the magnetization of the magnetic recording medium with a large microwave magnetic field.

Figure 4:
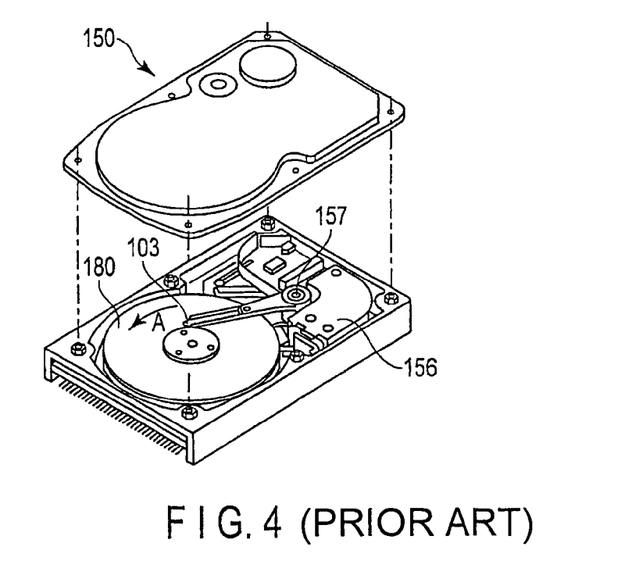
FIG. 4 is a perspective view showing an outline of the arrangement of a magnetic recording/reproduction apparatus capable of incorporating the magnetic head according to the embodiment.

FIG. 4 is a perspective view showing an outline of the arrangement of a magnetic recording/reproduction apparatus capable of incorporating the magnetic head according to the embodiment.

That is, a magnetic recording/reproduction apparatus 150 is an apparatus using a rotary actuator. Referring to FIG. 4, a recording medium disk 180 is fitted on a spindle 152, and rotated in the direction of an arrow A by a motor (not shown) that responds to a control signal from a driver controller (not shown). The magnetic recording/reproduction apparatus 150 may also include a plurality of medium disks 180.

A head slider 103 for performing recording and reproduction of information to be stored in the medium disk 180 has the arrangement as described above with reference to FIG. 3, and is attached to the distal end of a thin-film suspension 154. The magnetic head according to the embodiment, for example, is mounted near the distal end of the head slider 103.

When the medium disk 180 rotates, the air bearing surface (ABS) of the head slider 103 is held with a predetermined floating amount from the surface of the medium disk 180. The head slider 103 may also be a so-called "contact running type slider" that comes in contact with the medium disk 180.

The suspension 154 is connected to one end of an actuator arm 155 including a bobbin for holding a driving coil (not shown). A voice coil motor 156 as a kind of a linear motor is formed at the other end of the actuator arm 155. The voice coil motor 156 includes the driving coil (not shown) wound around the bobbin of the actuator arm 155, and a magnetic circuit including a permanent magnet and counter yoke facing each other so as to sandwich the coil between them.

The actuator arm 155 is held by ball bearings (not shown) formed in upper and lower portions of a spindle 157, and freely rotated and slid by the voice coil motor 156.

Figure 5:
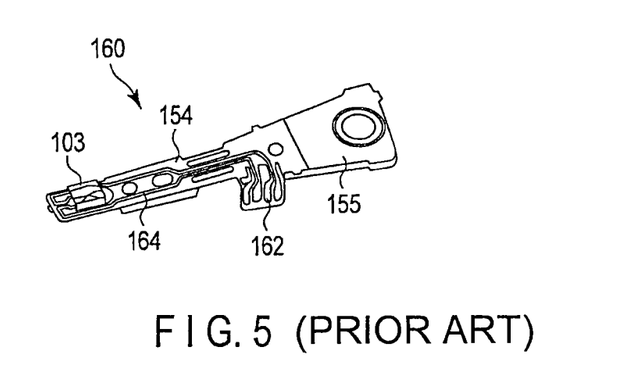
FIG. 5 is a schematic view showing an example of a magnetic head assembly capable of incorporating the magnetic head according to an embodiment.

FIG. 5 is a schematic view showing an example of a magnetic head assembly capable of incorporating the magnetic head according to the embodiment.

FIG. 5 is an enlarged perspective view showing, from the disk side, a magnetic head assembly formed ahead of an actuator arm 155. That is, a magnetic head assembly 160 includes the actuator arm 155 including a bobbin for holding a driving coil, and a suspension 154 is connected to one end of the actuator arm 155.

A head slider 103 including the magnetic head 30 shown in FIG. 3 is attached to the distal end of the suspension 154. The suspension 154 has lead wires 164 for signal write and read, and the lead wires 164 are electrically connected to the electrodes of the magnetic head incorporated into the head slider 103. Reference numeral 162 shown in FIG. 5 denotes electrode pads of the magnetic head assembly 160.

EXAMPLES

The embodiment will be explained in detail below by way of its examples.

Example 1

A square STO of 50 nm side was formed on a main magnetic pole having a width of 50 nm, and a return yoke was formed on the STO. The main magnetic pole was made of FeCO, and the return yoke was made of FeCoNi. The main magnetic pole and return yoke also served as electrodes, and interconnections were formed so as to apply a driving voltage perpendicularly to the film surfaces of the STO. A coil for inducing a magnetic field was formed in the main magnetic pole, and an interconnection was connected to the coil so as to supply a recording current.

As the STO, layers shown in structure 1 below were sequentially deposited.

The deposition method was DC magnetron sputtering, and the deposition conditions were that the back pressure was $2\times10^{-6}$ Pa and the argon partial pressure was $2\times10^{-1}$ Pa.

Structure 1:
Underlayer Ta 3 nm/Pt 2 nm
Spin injection layer (Co 0.4 nm/Pt 0.3 nm) stacked 15 times
Soft magnetic layer FeCo 2 nm
Nonmagnetic interlayer Cu 2 nm/
Oscillation layer $Fe_{45}Co_{45}Al_{10}$ 12 nm
Cap layer Ru 15 nm The obtained STO was patterned as shown in FIGS. 2A, 2B, 2C, 2D, and 2E, and a filling layer was formed by using Cu as a metal region and $SiO_2$ as an insulator region, thereby manufacturing a magnetic head. The difference $\Delta t$ between the position of the interface between the nonmagnetic interlayer and oscillation layer and the position of the interface between the insulator region and metal region was set at 0.5 nm.

The oscillation of the obtained magnetic head was evaluated by measuring the oscillation frequency. For example, a gap magnetic field was generated by applying a recording current of 60 mA, and the relationship between the driving voltage and oscillation frequency was measured in this state. Consequently, the driving voltage measured when the oscillation frequency reached 20 GHz was 53 mV.

Table 1 below shows the result.

Comparative Example 1

As Comparative Example 1, a magnetic head was obtained by forming an entire filling layer by using an $SiO_2$ insulator material following the same procedures as in Example 1, except that planarization was performed by CMP in FIG. 2C and the oscillation layer was exposed halfway by RIE in FIG. 2D. The difference $\Delta t$ between the position of the interface between the nonmagnetic interlayer and oscillation layer and the position of the interface between the insulator region and metal region was set at 15 nm.

Note that the structure of the STO was as follow.
Structure 2:
Underlayer Ta 3 nm/Pt 2 nm
Spin injection layer (Co 0.4 nm/Pt 0.3 nm) stacked 15 times
Soft magnetic layer FeCo 2 nm
Nonmagnetic interlayer Cu 2 nm/
Oscillation layer $Fe_{45}Co_{45}Al_{10}$ 12 nm
Cap layer Ru 15 nm The oscillation of the obtained magnetic head was evaluated in the same manner as in Example 1. Consequently, the driving voltage measured when the oscillation frequency reached 20 GHz was 100 mV.

Table 1 below shows the result.

In Comparative Example 1, the SIL having perpendicular magnetic anisotropy was entirely buried by the insulator. Therefore, when supplying electrons from the FGL to the SIL by the precession oscillation of the FGL, electrons extremely spin-polarized throughout the whole thickness of the FGL entered the SIL. Consequently, the magnetization direction that should be perpendicularly stable became unstable as it was drawn in the direction of spin caused by the precession of the FGL.

By contrast, Example 1 was able to significantly decrease the driving voltage.

Comparative Example 2

As Comparative Example 2, a magnetic head was manufactured following the same procedures as in Example 1 except that the difference $\Delta t$ between the position of the interface between the nonmagnetic interlayer and oscillation layer and the position of the interface between the insulator region and metal region was set at 0.2 nm in FIG. 2E.

An STO having structure 3 below was formed following the same procedures as in Example 1.
Structure 3:
Underlayer Ta 3 nm/Pt 2 nm
Spin injection layer (Co 0.4 nm/Pt 0.3 nm) stacked 15 times
Soft magnetic layer FeCo 2 nm
Nonmagnetic interlayer Cu 2 nm/
Oscillation layer $Fe_{45}Co_{45}Al_{10}$ 12 nm
Cap layer Ru 15 nm The oscillation of the obtained magnetic head was evaluated in the same manner as in Example 1. Consequently, the driving voltage measured when the oscillation frequency reached 20 GHz was 180 mV.

Table 1 below shows the result.

When the metal buried portion was formed too close to the nonmagnetic interlayer as in Comparative Example 2, spin-polarized electrons flowed to the sidewalls before the electrons sufficiently transferred the angular momentum. This presumably decreased the efficiency.

When compared to Comparative Example 2, Example 1 was able to significantly decrease the driving voltage.

TABLE 1

| Sample | $\Delta t$ (nm) | Driving voltage (mV) |
| --- | --- | --- |
| Comparative Example 1 | 15 | 100 |
| Example 1 | 0.5 | 53 |
| Comparative Example 2 | 0.2 | 180 |

Note that the STO 20 was formed between the main magnetic pole and auxiliary magnetic pole as shown in FIG. 3.

On the air bearing surface, the main magnetic pole can be formed to have a length of about 20 to 200 nm in the direction of a recording track and a width of about 20 to 200 nm in the direction of an adjacent track. The STO can be formed to have the same size as the main magnetic pole width in the widthwise direction of the main magnetic pole, and can also be formed to be sandwiched between the main magnetic pole and auxiliary magnetic pole in the recording track direction. Furthermore, the STO can be processed to have a height of 20 to 200 nm from the air bearing surface.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic head comprising:
    a main magnetic pole configured to apply a recording magnetic field to a magnetic recording medium;
    an auxiliary magnetic pole configured to form a magnetic circuit together with the main magnetic pole;
    a spin torque oscillation element formed between the main magnetic pole and the auxiliary magnetic pole; and
    a filling layer formed on side of the spin torque oscillation element between the main magnetic pole and the auxiliary magnetic pole,
    wherein the spin torque oscillation element includes a spin injection layer formed on one of the main magnetic pole and the auxiliary magnetic pole, a nonmagnetic interlayer formed on the spin injection layer, and an oscillation layer formed on the nonmagnetic interlayer,
    the filling layer is divided into an insulator region and a metal region from a first interface as a boundary, and the first interface is positioned on a side surface of the oscillation layer, and
    the insulator region is formed from a side of the spin injection layer to a side of the nonmagnetic interlayer and to a side of one portion of the oscillation layer, the metal region is formed on a side of the other portion of the oscillation layer, and a difference $\Delta t$ between a position of the first interface and a position of a second interface between the nonmagnetic interlayer and the oscillation layer is not less than 0.5 nm.

2. The head according to claim 1, wherein the difference between the position of the first interface and the position of the second interface is not more than 10 nm.

3. The head according to claim 1, wherein a metal material used in the metal region is at least one metal selected from the group consisting of aluminum, platinum, copper, ruthenium, gold, silver, palladium, osmium, iridium, and alloys thereof.

4. A magnetic recording/reproduction apparatus comprising a magnetic head comprising:
    a main magnetic pole configured to apply a recording magnetic field to a magnetic recording medium;
    an auxiliary magnetic pole configured to form a magnetic circuit together with the main magnetic pole;
    a spin torque oscillation element formed between the main magnetic pole and the auxiliary magnetic pole; and
    a filling layer formed on side of the spin torque oscillation element between the main magnetic pole and the auxiliary magnetic pole,
    wherein the spin torque oscillation element includes a spin injection layer formed on one of the main magnetic pole and the auxiliary magnetic pole, a nonmagnetic interlayer formed on the spin injection layer, and an oscillation layer formed on the nonmagnetic interlayer,
    the filling layer is divided into an insulator region and a metal region from a first interface as a boundary, and the first interface is positioned on a side surface of the oscillation layer, and
    the insulator region is formed from a side of the spin injection layer to a side of the nonmagnetic interlayer and to a side of one portion of the oscillation layer, the metal region is formed on a side of the other portion of the oscillation layer, and a difference $\Delta t$ between a position of the first interface and a position of a second interface between the nonmagnetic interlayer and the oscillation layer is not less than 0.5 nm.

5. The apparatus according to claim 4, wherein the difference between the position of the first interface and the position of the second interface is not more than 10 nm.

6. The apparatus according to claim 4, wherein a metal material used in the metal region is at least one metal selected from the group consisting of aluminum, platinum, copper, ruthenium, gold, silver, palladium, osmium, iridium, and alloys thereof.

* * * * *

UNITED STATES PATENT AND TRADEMARK OFFICE
CERTIFICATE OF CORRECTION

| | |
|---|---|
| PATENT NO. | : 8,724,262 B1 |
| APPLICATION NO. | : 13/903077 |
| DATED | : May 13, 2014 |
| INVENTOR(S) | : Koui |

It is certified that error appears in the above-identified patent and that said Letters Patent is hereby corrected as shown below:

On the title page, Item (71), should read:

Item -- (71) Kabushiki Kaisha Toshiba, Minato-ku (JP) --

Signed and Sealed this
Sixteenth Day of September, 2014

Michelle K. Lee
*Deputy Director of the United States Patent and Trademark Office*